May 22, 1951 E. H. LILLQUIST 2,553,924
POWER SAW AND SANDER
Filed Nov. 21, 1949
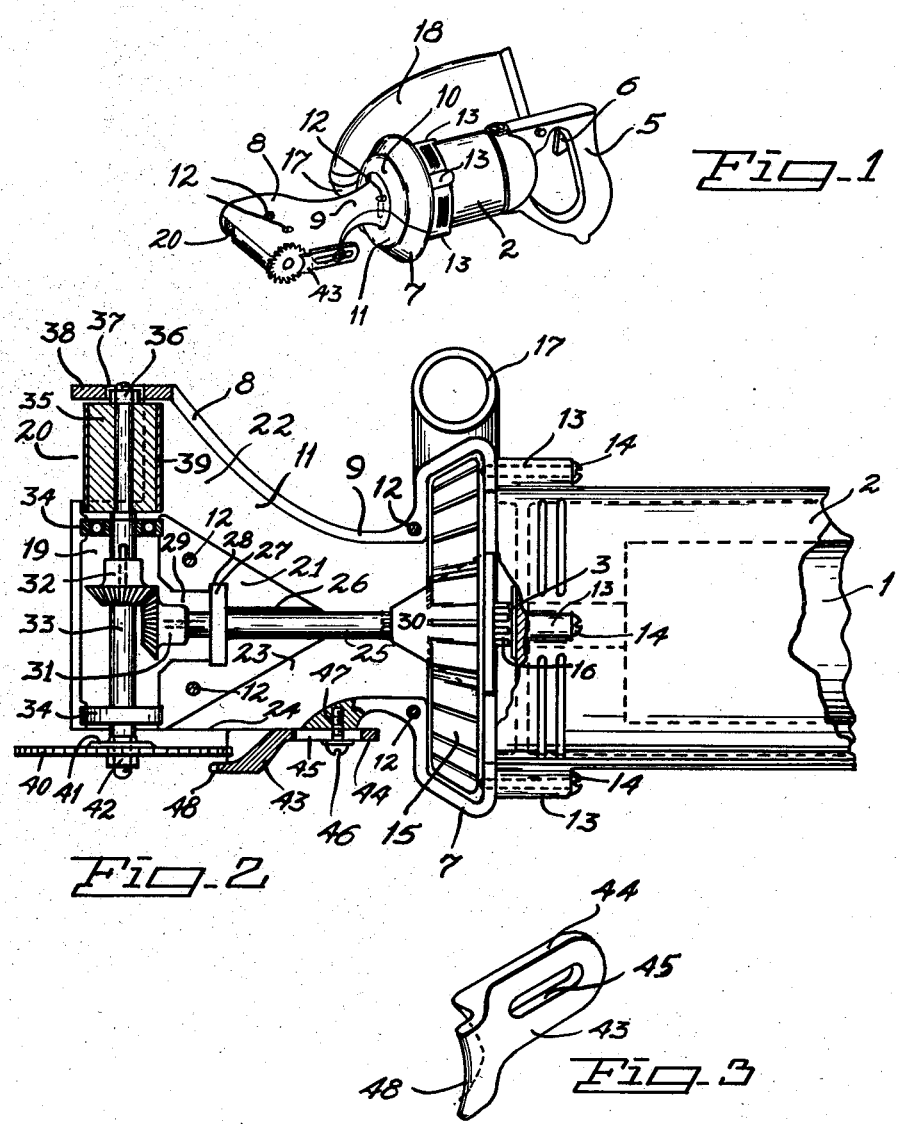
Inventor
Edward H. Lillquist
By Glenn L. Fish
Attorney Patented May 22, 1951

2,553,924

UNITED STATES PATENT OFFICE 2,553,924

POWER SAW AND SANDER

Edward H. Lillquist, Spokane, Wash.

Application November 21, 1949, Serial No. 128,591

2 Claims. (Cl. 51—170)

This invention relates to a power saw and sander and it is one object of the invention to provide a tool of this character which is particularly adapted for use by workmen engaged in laying tile floors, linoleum, wallboards, and the like which must be cut in order that they will have a neat fit when laid upon a floor or mounted against a wall of a room.

Another object of the invention is to provide a power operated tool wherein a rotary saw and a rotary sander are mounted adjacent opposite sides of a head which projects forwardly from a fan housing, the said head and a neck for the head being formed with passages through which saw dust and dust from the sander will be drawn by a suction fan in the fan housing and delivered into a dust bag applied to the outlet of the fan housing. It will thus be seen that all dust created during use of the tool will be collected in a dust bag instead of floating in the air of a room in which work is being performed and the dust will not be carried into the lungs of the workmen and also there will be less dirt to remove from a newly laid floor.

Another object of the invention is to provide a combined saw and sander which may be applied to the front end of the casing of an electric motor of the type used for electrically operated tools and having a handle at its rear end by means of which the tool is held while in use.

Another object of the invention is to provide a combined saw and sander which is very compact and will be of sufficiently light weight to permit it to be easily held in a person's hands when in use and readily carried from one place to another by a work man.

The invention is illustrated in the accompanying drawings wherein:

Fig. 1 is a perspective view of the improved power saw and sander.

Fig. 2 is a view upon an enlarged scale showing the saw and sander partially in top plan and partially in longitudinal section.

Fig. 3 is a perspective view of a deflector by means of which saw dust is directed into a dust passage of the tool.

This improved power saw and sander has a power unit consisting of an electric motor 1 which is mounted in a cylindrical casing 2 in the usual manner and has its shaft 3 projecting forwardly from the front end of the casing and the end is splined as shown at 16 in Fig. 2. At the rear end of the casing is a handle 5 by means of which it is held during use of the tool and this handle carries a switch having an operating trigger 6 disposed in such position that it may be readily actuated by a finger of a hand grasping the handle and current for the motor turned on or off at the will of the workman.

Attached to the front end of the motor casing is a fan housing 7 and spaced forwardly from the fan housing is a head 8 connected with the fan housing by a rearwardly extending neck 9. The fan housing, the head, and the neck connecting them form a unit which is mounted upon the motor casing, and from an inspection of Figure 1 it will be seen that this unit consists of upper and lower sections 10 and 11 which are disposed in closed fitting engagement with each other and secured by screws or bolts 12 so that the unit may be taken apart when necessary. At opposite sides of the motor casing are sleeves 13 and through these sleeves pass screws 14 by means of which the fan housing is detachably held in engagement with the motor casing. A suction fan 15 is disposed within the fan housing and has a rear, internally splined socket to receive the projecting motor shaft 3 so that the fan will be turned with the motor shaft and air drawn rearwardly into the fan housing and then discharged through a neck 17 to which a dust bag 18 is attached. It will be understood that other means may be provided for releasably connecting the fan shaft with the motor shaft. At the front of the head is a chamber 19 which extends transversely of the head and has its inner end spaced from the right hand side of the head. The portion of the front end of the head between the inner end of the chamber 19 and the right hand side of the head is formed with a recess 20 defining a pocket having an opening along its bottom and front portion. At the back of the chamber is a block 21 which projects rearwardly therefrom and is formed by companion portions of the two sections 10 and 11. This block tapers rearwardly and defines passages 22 and 23 which converge rearwardly and communicate with the hollow neck 9 so that air flowing rearwardly through these passages may pass through the neck and into the fan housing, the passage 22 having its front end communicating with the pocket 20 so that dust from a sander will be drawn rearwardly from this pocket and the passage 23 having its front end terminating in an inlet opening 24 located in the left hand side of the head rearwardly of the chamber 19 and constituting an entrance or inlet for saw dust.

A drive shaft 25 extends longitudinally of the head and is rotatably mounted through a bore 26 formed midway the width of the block 21 and also rotatably supported through a bearing 27 mounted in an annular recess 28 formed about the rear end of a recess or throat 29 leading rearwardly from the chamber 19 midway the length thereof. The rear end of the drive shaft is fitted into the hub 30 of the fan so that the drive shaft turns with the fan and at its front end the drive shaft carries a bevelled gear 31 which meshes with a bevelled gear 32 carried by and keyed to a driven shaft 33 so that rotary motion will be transmitted to the driven shaft. This driven shaft extends longitudinally through the chamber 19 and the pocket 20 and is rotatably mounted through bearings 34 mounted in end portions of the chamber. A spool 35 fits about the portion of the driven shaft within the pocket and turns therewith, the spool being held upon the shaft by a nut 36 applied to the shaft through an opening 37 formed in the end wall 38 of the pocket. This spool carries an abrasive, such as the sand paper 39, and the spool and its covering of sand paper thus forms a rotary sander by means of which an edge face of a tile or wall board may be smoothed or bevelled when moved across the sander. Dust created during this standing operation is drawn rearwardly through the passage 22 and the hollow neck into the fan housing from which it is discharged into the dust bag 12. The left hand end portion of the driven shaft protrudes from the head and carries a circular saw 40 which is firmly secured thereon and clamped against a collar 41 by a nut 42 screwed upon the shaft. This saw is used for cutting tiles, wall board, and thick linoleum and is of such diameter that its rear portion overlaps the entrance opening 24 of the air passage 23. Saw dust thrown off by the teeth of the saw is carried through the passage 23 and the neck into the fan housing from which it is discharged through the neck 17, and into the dust bag. In order that the saw dust will be directed into the opening 24 there has been provided a deflector 43 which is formed as shown in Figure 3 and applied to the left hand side of the head as shown in Figures 1 and 2. This deflector is formed of cast metal and has a shank 44 extending rearwardly thereof and formed with a longitudinally extending slot 45. A screw 46 which is passed through the slot and into a threaded socket 47 formed in the head holds the deflector against the head and when the screw is loosened the deflector may be shifted longitudinally towards and away from the saw 40. This deflector extends forwardly partially across the opening 24 and at its front end is formed with a lip 48 which overlaps the rear portion of the saw. The width of the deflector is such that it fully covers the portion of the opening 24 overlapped thereby and saw dust will be guided into the opening 24 and the passage 23. It will thus be seen that dust from the saw as well as the sander will be drawn rearwardly through the head and its hollow neck into the fan housing and discharged therefrom into the dust bag. Therefore all dust will be collected in the bag and will not float in the air and be injurious to workmen using the combined saw and sander. When cleaning or repairs are necessary the screws or bolts 12 may be removed and the two sections 10 and 11 separated and when use of the combined saw and sander is not necessary it may be readily detached from the motor casing by removing the screws 14 and other implements applied to the motor.

Having thus described the invention, what is claimed is:

1. A power tool of the character described comprising a motor casing, a motor therein having a forwardly projecting shaft, a fan housing at the front end of said motor casing having a centrally located inlet opening at its front and an outlet neck extending from its periphery at one side of the motor casing, a dust bag connected with said neck, a suction fan in said housing having a hub connected with the motor shaft, a hollow neck projecting forwardly from said housing about the inlet opening, a hollow head in front of said fan housing connected with the fan housing by said neck and having a transversely extending chamber across its front end and an opening between the inner end of the chamber and one side of the head, a partition extending rearwardly from said chamber and defining dust passages diverging forwardly from the neck, one passage communicating with the said opening at the front of the head and the other passage opening through the other side of the head back of said chamber, said partition being formed with a bore extending longitudinally thereof and having its front end communicating with the chamber intermediate the ends thereof, a bearing in said bore, a rotary drive shaft extending through said bore and having its rear portion extending longitudinally of said neck and connected with the hub of said suction fan, a rotary driven shaft extending longitudinally in said chamber with one end projecting outwardly from the chamber and its other end portion extending longitudinally through the opening at the front of the head, bevelled gears carried by the drive shaft and the driven shaft and intermeshing to transmit rotary motion from the drive shaft to the driven shaft, a rotary sander carried by the portion of the driven shaft passing through the front opening of the head, a circular saw carried by the outer end of said driven shaft and having a rear portion overlapping the side opening of the head back of said chamber, and a deflector mounted upon said head back of the side opening and extending forwardly in overlapping relation to the rear portion of the circular saw and constituting means for directing saw dust inwardly through the last mentioned side opening.

2. The structure of claim 1 wherein the deflector has a shank fitting against a side of the head and formed with a longitudinally extending slot, and a fastener for said deflector passing through said slot and thereby permitting shifting of the deflector towards and away from the saw to adjusted positions.

EDWARD H. LILLQUIST.

REFERENCES CITED

The following references are of record in the file of this patent:

UNITED STATES PATENTS

| Number | Name | Date |
| --- | --- | --- |
| 1,483,966 | Collins | Feb. 19, 1924 |
| 1,619,158 | Schimmelpfennig | Mar. 1, 1927 |
| 1,785,065 | Aborn | Dec. 16, 1930 |
| 1,900,331 | Clarke | Mar. 7, 1933 |
| 2,440,440 | Hadwiger | Apr. 27, 1948 |